United States Patent [19]
Florian

[11] Patent Number: 5,584,416
[45] Date of Patent: Dec. 17, 1996

[54] PROCESS AND DEVICE FOR REMOVING GAS BUBBLES FROM A VISCOUS LIQUID TO BE DISPENSED

[75] Inventor: Gerhard Florian, Holzkirchen, Germany

[73] Assignee: Loctite Europa EEIG, Germany

[21] Appl. No.: 508,892

[22] Filed: Jul. 28, 1995

[30] Foreign Application Priority Data

Jul. 29, 1994 [DE] Germany .......................... 44 27 013.5

[51] Int. Cl.⁶ .................................................. B01D 19/00
[52] U.S. Cl. .................. 222/1; 95/266; 96/157; 96/193; 222/64; 222/394; 222/559
[58] Field of Search .................... 222/1, 64, 190, 222/394, 504, 559; 95/266; 96/157, 193

[56] References Cited

U.S. PATENT DOCUMENTS

| | | | |
|---|---|---|---|
| D. 261,400 | 10/1981 | Beall et al. | D19/66 |
| 2,107,732 | 2/1938 | Gustafsson et al. | 299/140.1 |
| 2,296,079 | 9/1942 | Anderson | 299/59 |
| 2,913,187 | 11/1959 | Anderson | 239/412 |
| 3,291,396 | 12/1966 | Walter | 239/412 |
| 3,463,363 | 8/1969 | Zelna | 222/334 |
| 3,616,599 | 11/1971 | Burnham, Sr. | 95/266 X |
| 3,622,050 | 11/1971 | Acton et al. | 222/309 |
| 3,926,664 | 12/1975 | Verreydt | 95/266 X |
| 4,257,562 | 3/1981 | Zini | 239/590.3 |
| 4,921,133 | 5/1990 | Roeser | 222/63 |
| 4,953,756 | 9/1990 | Breault et al. | 222/309 |
| 4,997,464 | 3/1991 | Kopf | 96/157 X |
| 5,180,403 | 1/1993 | Kogure | 95/266 X |
| 5,509,954 | 4/1996 | Derian et al. | 95/266 X |

FOREIGN PATENT DOCUMENTS

| | | |
|---|---|---|
| 0184691 | 6/1986 | European Pat. Off. . |
| 0492801 | 7/1992 | European Pat. Off. . |
| 0507584 | 10/1992 | European Pat. Off. . |
| 0508585 | 10/1992 | European Pat. Off. . |
| 2522324A1 | 12/1976 | Germany . |
| 3038940A1 | 5/1981 | Germany . |
| 3143459A1 | 5/1983 | Germany . |
| WO92/02306 | 2/1992 | WIPO . |

*Primary Examiner*—Kevin P. Shaver
*Attorney, Agent, or Firm*—Edward K. Welch, II; Steven C. Bauman; Eugene F. Miller

[57] ABSTRACT

To remove gas bubbles from a viscous liquid (L) to be dispensed, the liquid (L) is introduced with a first pressure in a thin, broad jet into a sealed chamber (15) which is partially filled with the liquid (L), with the result that the gas bubbles can escape from the introduced liquid. A second pressure, which is lower than the first pressure, prevails in the chamber (15), with the result that gas bubbles present in the liquid expand and burst. The difference between the first pressure, with which the liquid is introduced into the chamber (15), and the second pressure, prevailing in the chamber (15), is constant.

19 Claims, 4 Drawing Sheets

5,584,416

PROCESS AND DEVICE FOR REMOVING GAS BUBBLES FROM A VISCOUS LIQUID TO BE DISPENSED

The invention relates to a process and a device for the removal of gas bubbles from a viscous liquid to be dispensed, the liquid being introduced under pressure in a thin jet into a sealed chamber within a vessel which is partially filled with the liquid, with the result that the gas bubbles are released from the introduced liquid. The liquid is guided out of the vessel to a dispensing apparatus.

BACKGROUND OF THE INVENTION

U.S. Pat. No. 4,257,562 describes a process in which the liquid is introduced into a vessel by means of a peristaltic pump through a horizontal slot aperture. Situated at the top of the vessel is a ventilation aperture, and the collected gas is from time to time discharged manually or automatically through a suitable vent valve. The liquid is conducted out of the vessel to a spray nozzle.

It is known from U.S. Pat. No. 4,921,133 to conduct the liquid out of a pressure tank into the vessel, a vacuum prevailing in the vessel, with the result that the gas bubbles present in the liquid increase their volume and burst. In the vessel, the liquid is fed onto a rotating disk, from which it is thrown by centrifugal force against the vertical vessel walls. Suitable sensors are provided for control of the level of liquid in the vessel.

The liquid is removed from the vessel by a screw pump and delivered to the dispensing apparatus.

Known from WO 92/02306 is a degassing device in which the liquid to be degassed is fed alternately to one of two vessels, with the result that two degassing vessels are therefore necessary for continuous operation. The liquid is degassed in the vessels by screening and application of a vacuum. After the degassing of the quantity of liquid present in a vessel, that quantity is fed to the dispensing apparatus by a peristaltic hose pump after lifting of the vacuum.

The object of the invention is to provide a process and a device for the removal of gas bubbles from a liquid to be dispensed which are marked by reliability of operation and make possible a continuous deposition of the liquid e.g. onto a workpiece.

SUMMARY OF THE INVENTION

This object is achieved with the process according to the invention in that a lower, second pressure prevails in the chamber within the vessel, with the result that gas bubbles present in the liquid expand and burst, and in that the difference between the first pressure, with which the liquid is introduced into the chamber, and the second pressure, prevailing in the chamber, is constant.

The liquid in the vessel is preferably kept at a level which lies below the point at which the liquid is introduced into the inside of the vessel.

The liquid is preferably delivered to a dispensing apparatus by the second pressure prevailing in the vessel.

The first pressure and the second pressure are preferably constant.

The gas of the gas bubbles from the vessel is preferably conducted out of the vessel at the constant, second pressure.

The device for carrying out this process is characterized in that the apparatus for supplying the liquid supplies the liquid at a constant first pressure and in that the apparatus for conducting the collected gas out of the vessel is a precision pressure regulator which maintains a lower, constant second pressure in the chamber.

The device preferably has a number of hollow needles for feeding the liquid into the chamber inside the vessel, the needles pointing upwards and being inclined slightly radially outwards.

The ends of the needles are preferably markedly flattened, so that slot-shaped apertures result at the end of the needles for the emergence of the liquid.

The feed line for the liquid preferably extends from above centrally into the vessel and has at the lower end several connecting apertures to the hollow needles, the liquid flow being deflected upwards by virtually 180°. The lower end of the feed line is provided with a dispensing cone which ends in a sharp point below. At its upper end, the dispensing cone has an annular surface surrounding the feed line. This annular surface drops away somewhat to the outside and the hollow needles project upwards from it.

The advantages achievable through the invention are in particular that the pressure with which the liquid is supplied to the vessel is reduced to a lower, second pressure in the vessel, with the result that the persisting residual pressure, the second pressure, is enough to feed the liquid from the vessel to the dispensing apparatus and discharge it from the latter. Since the second pressure can be kept very precisely at a specific value by a precision pressure regulator, the discharge of the liquid by the dispensing apparatus takes place with an extremely constant throughflow value.

The process according to the invention and the device according to the invention are suitable in particular for the application of medium- and high-viscosity anaerobic adhesives. It is of advantage that, to remove the gas bubbles, the pressure in the vessel need be reduced only to the point where the existing gas bubbles, in particular air bubbles, are removed from the adhesive, but the oxygen dissolved in the adhesive forms no new air bubbles and does not escape. This dissolved oxygen is necessary with anaerobic adhesives in order to prevent a premature setting of the adhesive.

It is also of advantage that the pressure in the connecting line between vessel and dispensing apparatus remains constant, with the result that no new gas bubbles form in this connecting line either. When the stock vessel from which the viscous liquid is delivered into the degassing vessel under the first pressure is changed, the dispensing of liquid from the degassing vessel is also maintained as long as there is still liquid in the degassing vessel. The stock tank can thus be changed without interruption of the dispensing of the degassed liquid from the chamber. The second pressure prevailing in the vessel prevents a pressure drop in the liquid dispensed from the vessel thus preventing the formation of new gas bubbles and the need for additional degassing.

The effect of the alignment of the hollow needles themselves and of their slot-shaped outlet apertures is that medium- and high-viscosity liquids emerge obliquely upwards in a flat jet or bead and then tip downwards on an arc with a very small radius and run downwards along the outside of the needles and of the tapering dispensing cone. In the zone of this jet or bead arc immediately after the emergence of the liquid from the slot apertures of the needles, the liquid abuts nowhere and, for this reason and because of the slotted shape of the needle apertures, has a very large surface. Gas bubbles present in the liquid therefore inevitably have contact with a free surface of the liquid jet, with the result that they burst and thus leave the liquid. Because the liquid then runs downwards along the needles and the conical intermediate piece, the formation of new air bubbles is also prevented here.

The formation of air bubbles is prevented by the conically downward tapering shape of the dispensing cone, especially upon assembly of the vessel.

BRIEF DESCRIPTION OF THE DRAWINGS

An embodiment of the invention is explained below with reference to the drawing. Shown are.

DETAILED DESCRIPTION OF THE PREFERRED EMBODIMENTS

Figure 1:
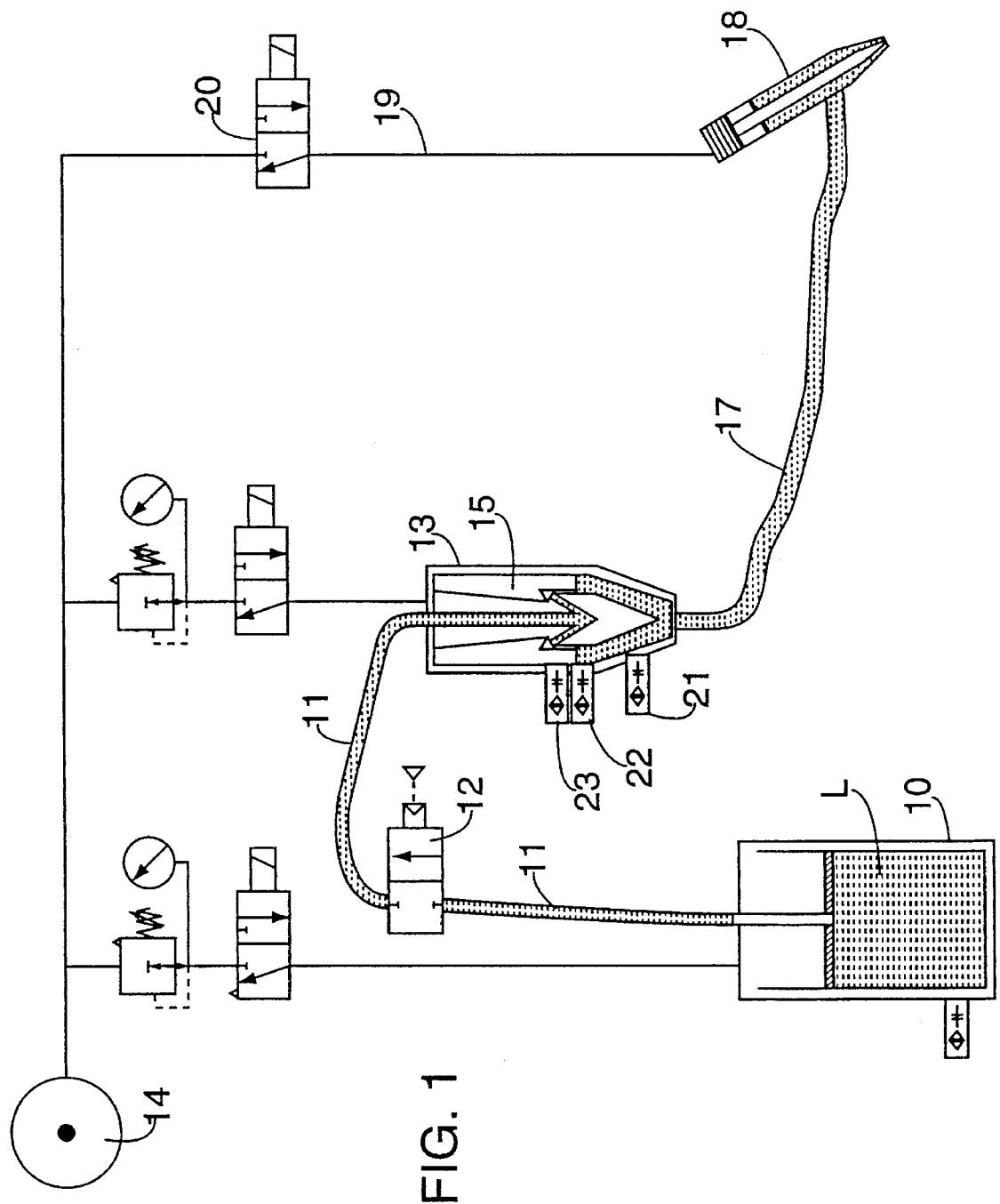
FIG. 1 in diagrammatic form, a system for supplying a liquid, for removing air bubbles from the liquid and for dispensing the liquid.

According to FIG. 1, the liquid L to be dispensed is fed from a pressure tank 10 via a feed line 11 and a feed valve 12 to a degassing vessel 13 for the removal of gas bubbles from the liquid L. The feed pressure is supplied by a compressed-air source 14 which acts, via a pressure regulator and a control valve, on a piston lying on the liquid L in the pressure tank 10 or on such a membrane with compressed air of a first pressure value. The liquid L is fed to the degassing vessel 13 with this first pressure. Situated in the degassing vessel 13 is a chamber 15 to which the liquid L is fed and in which the pressure is kept constant at a lower, second value by means of a precision pressure regulator 16. As the first and second pressures are kept constant, the pressure difference which exists inside the chamber 15 is also constant. Because of this pressure difference, the gas bubbles present in the fed liquid L expand and finally burst. The liquid L degassed in this way collects at the bottom of the chamber 15 and is guided at the lower end of the degassing vessel 13 via a connecting line 17 to a dosing valve 18. The dosing valve 18 is pneumatically actuated, to which end it is connected to the compressed-air source 14 via a compressed-air line 19 and a shut-off valve 20.

Three sensors 21, 22 and 23 are provided at the degassing vessel 13. Situated at the lower end of the degassing vessel 13 or in the connecting line 17 is a first sensor 21 which establishes whether there is liquid L in the connecting line 17 and which issues a warning signal if the degassing vessel 13 runs empty. Situated in the central zone of the chamber 15 of the degassing vessel 13 is a second sensor 22 which produces a signal if the level of liquid inside the chamber 15 is too high. The feed valve 12 is closed by this signal. For safety reasons, there is also arranged, at a small distance above the second sensor 22, a third sensor 23 which likewise measures the level of liquid and, if the level of the liquid is too high, produces a signal by which the feed valve 12 is likewise closed and the pressure tank 10 is additionally made pressureless state and a warning signal is transmitted to the maintenance personnel.

Figure 2:
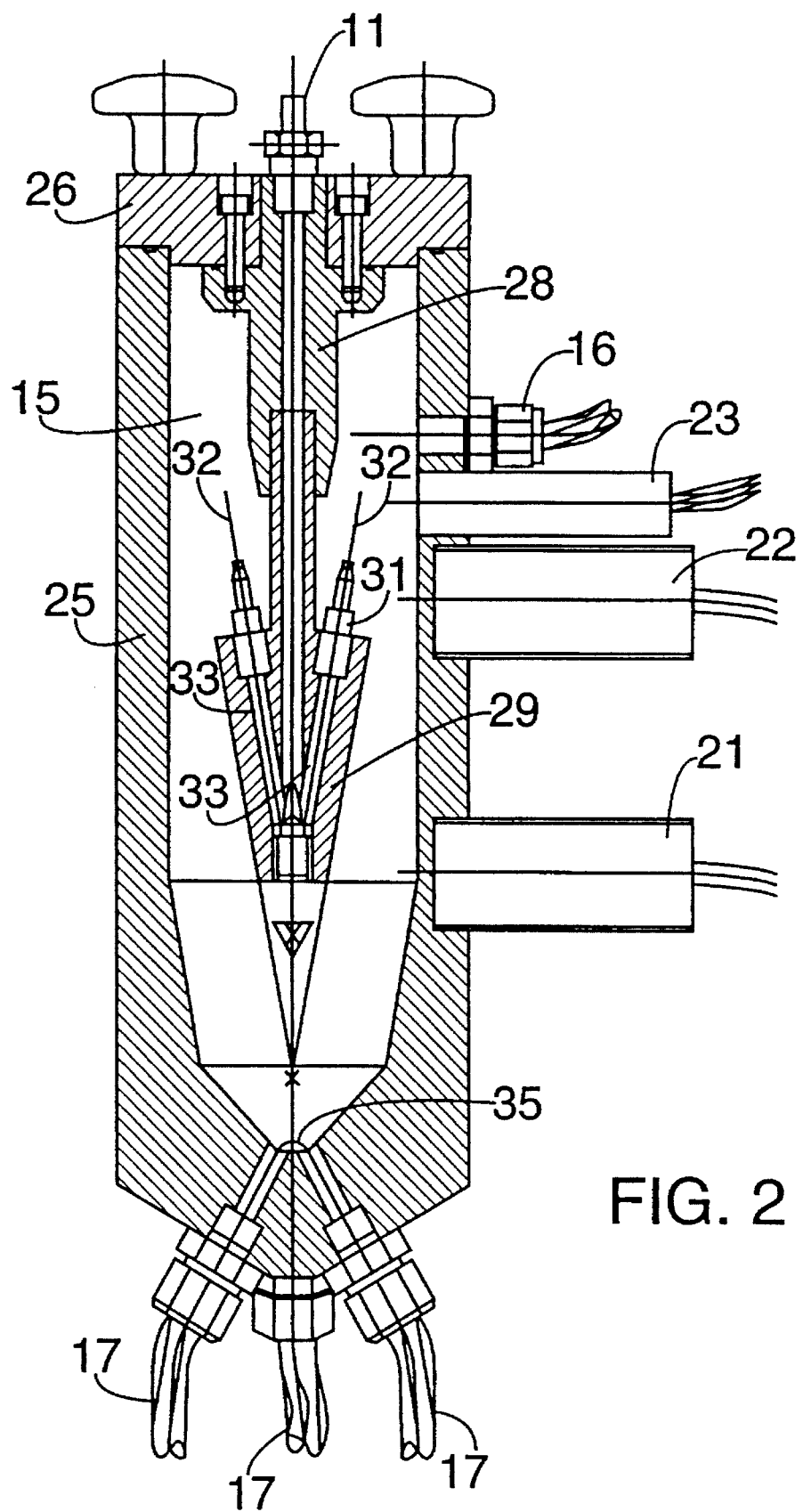
FIG. 2 in section, the vessel for removing gas bubbles from the liquid.
Figure 4:
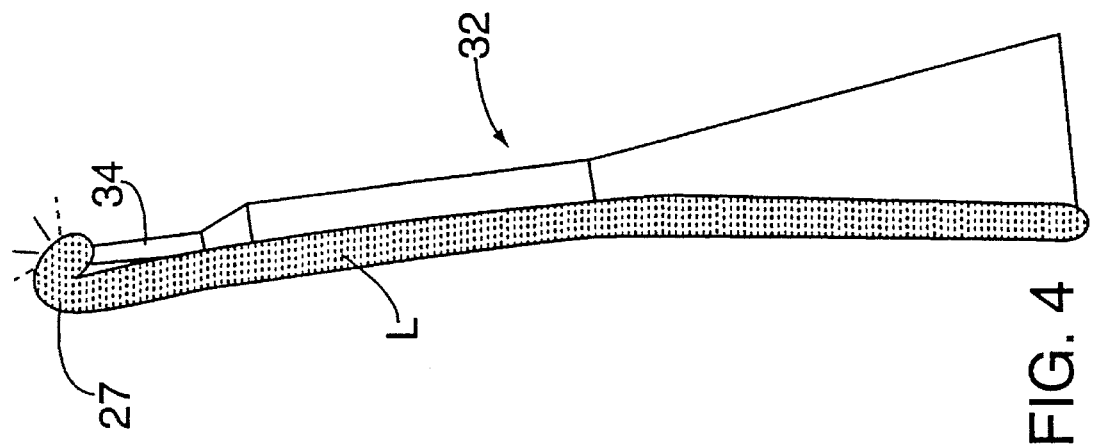
FIG. 4 in side view, a needle.
Figure 3:
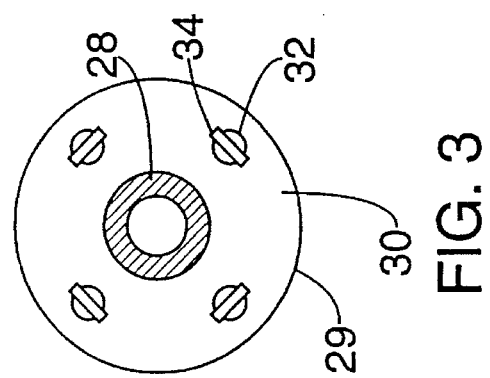
FIG. 3 from above, the dispensing cone with the hollow needles projecting from it, the inclination of the needles not being taken into account.

FIGS. 2 to 4 show, in section, the degassing vessel 13 and details of it. According to FIG. 2, the degassing vessel 13 is formed by a hollow cylindrical body 25 with a sealed bottom and a removable cover 26, with the result that the chamber 15 is sealed. The vessel 13 stands vertically upright. The feed line 11 is continued through the cover 26 in the form of a tube 28 axially central into the lower zone of the chamber 15. Attached to the lower end of the tube 28 is a dispensing cone 29 which ends in a sharp point below, its tip being only a small distance from the bottom of the chamber 15. At the upper side, the dispensing cone 29 has a annular surface 30 which surrounds the tube 28 and drops away obliquely to the side. A number of holders 31, disposed around the tube 28, and each holding a hollow needle 32, are screwed or set into this annular surface 30. Every needle 32 is connected via a duct 33 to the duct in the tube 28 and thus to the feed line 11. The needles 32 point almost vertically upwards, but are inclined slightly outwards, with the result that, with the axis of the chamber 15, they enclose a small angle of e.g. 15°. The needle tips 34 are tangentially flattened according to FIG. 3, i.e. the longer dimension of the slot-shaped apertures at the needle tips 34 point in circumferential direction. Combined with the slightly outward-pointing alignment of the needles 32, the effect is that the liquid emerging under pressure from the slot apertures has the shape of a flat strip. As a result of its radially outward-pointing movement component, this liquid jet or this liquid strip tips downwards, because of its relatively low jet velocity, in an arc 27 with a curvature radius of ca. 1 mm and the liquid then flows down along the outside of the needles 32, the obliquely dropping annular surface 30 and the outside of the dispensing cone 29 into the liquid present in the lower zone of the chamber 15.

Because of the pressure drop inside the liquid L over the fine needle duct, the air bubbles in the liquid increase in size upon emerging from the slot apertures and in so doing burst, with the result that the gas bubbles leave the liquid. The quantity of gas inside the chamber 15 thereby increases, and as a result the level of the liquid inside the chamber 15 falls or the pressure increases. The feed of liquid via the feed valve is controlled by the second and third sensors 22, 23 in such a way that the liquid lies in the zone of the dispensing cone 29. The pressure inside the chamber 15 is kept at a constant value, regardless of the level of liquid, by the precision pressure regulator 16.

The chamber 15 narrows conically downwards, and at the lowest point 35 are found outlet bores for the connection of one or more, in the present case three, dosing valves 18.

Figure 5:
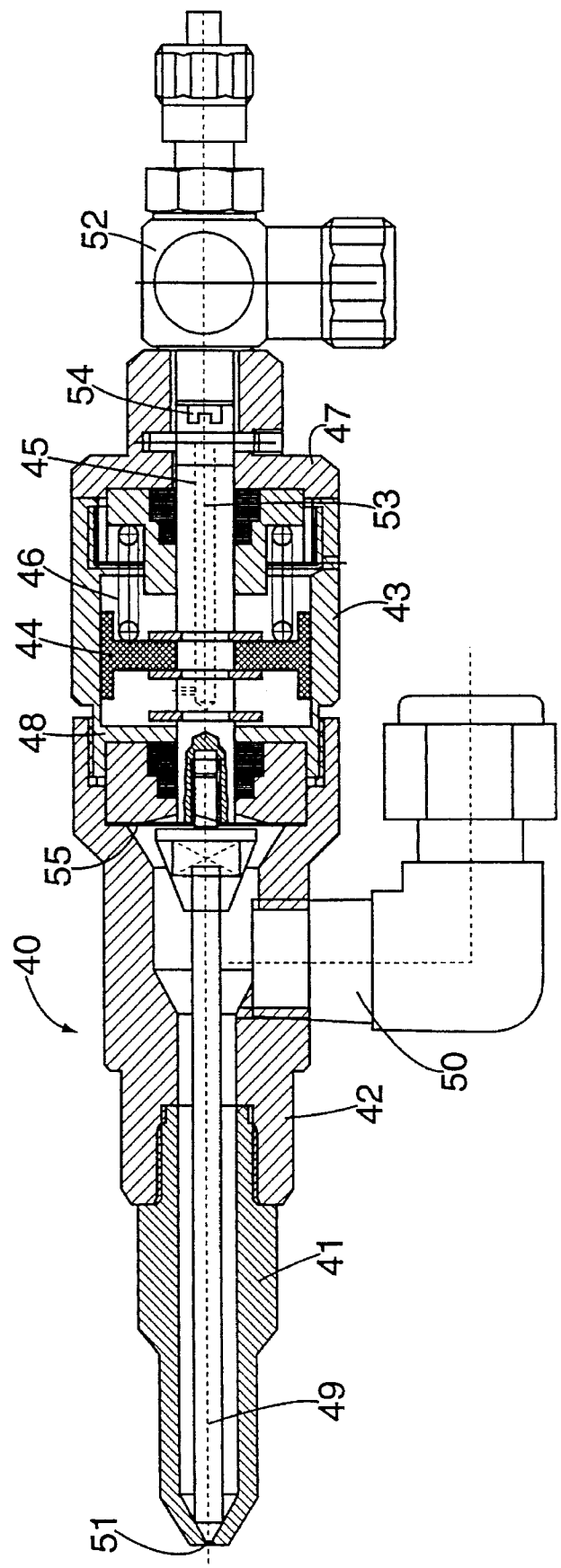
FIG. 5 in section, the dispensing apparatus.

The dosing valve 18 is represented in section in FIG. 5. According to this, it has a four-part housing 40 which consists of a tip 41, a middle section 42, a rear, cylindrical section 43 and a rear cover 47. A piston 44 is displaceably housed in the cylindrical section 43. The piston 44 is guided by a piston rod 45 and forced forward by a spiral compression spring 46. The cylindrical section 43 is sealed by the cover 47 and the piston rod 45 is guided in a central axial opening of the cover 47 and in a transverse wall 48 lying in front of the piston 44. Secured to the front end of the piston rod 45 is a needle valve 49 which extends axially through the middle section and the tip 41. The liquid to be dispensed is fed through a lateral connection opening 50, and flows through an axial flow channel which leads from the connection opening 50 through the middle section 42 and the tip 41 and tapers conically to form a dispensing aperture 51 at the front end. The front end of the needle valve 49 tapers conically in the same way and, under the force of the spiral compression spring 46 in the cylindrical section 43, rests against the tapered conical section of the tip of the needle valve and seals it. In the closed state, the tip of the needle valve 49 is flush with the front end of the tip 41 of the housing 40, with the result that there is no space in front of the needle valve 49 in which liquid could stop. The rear pneumatic section is separated from the front liquid section by a Teflon seal 55.

Compressed air can be conducted from the rear end, via a compressed-air connection 52 and via the compressed-air line 19 (FIG. 1) through an axial bore 53, starting from the rear end, of the piston rod and a small transverse bore at the front end of this axial bore 53, onto the front side of the piston 44, whereby the piston 44 is moved rearwards, in FIG. 5 to the right, and the needle valve 49 is pulled back from the dispensing aperture 51, with the result that liquid can flow through the axial flow channel and out of the dispensing aperture 51. The position up to which the needle valve 49 can be pulled back can be set by an adjusting screw 54 acting on the rear end of the piston rod 45.

Overall, the dosing valve 18 is so designed that the flow spaces have as small as possible a volume, in order that e.g. upon use for the deposition of adhesive, only a very small quantity of adhesive remains inside the dosing valve. Because, in the closed position, the needle valve 49 seals the tip 41 of the housing 40 in such a way that no space remains in front of the needle valve 49 in which liquid, e.g. adhesive, remains, then, upon opening of the dosing valve, there is no space at the tip of the needle valve 49 in which a lowering of pressure takes place through the pulling back of the needle valve 49. Such a lowering of pressure could be disadvantageous, as it can cause the formation of gas bubbles in the liquid.

The materials for the individual components of the degassing apparatus 13 and of the dosing valve 18 are not critical and can in particular be metal or plastic material. It is necessary to ensure that these materials are compatible with the liquid to be delivered from which the gas bubbles are removed.

What is claimed:

1. A process for the removal of gas bubbles from a viscous liquid, the process comprising the step of introducing the liquid, under a first pressure, as a thin, broad stream into a sealed chamber which is partially filled with the liquid and which is maintained at a second pressure which is lower than the first pressure and wherein the difference between the first pressure and the second pressure is constant.

2. The process according to claim 1, characterized in that the liquid in the chamber is kept at a level which lies below the point at which the liquid is introduced into the chamber.

3. The process according to claim 1, characterized in that the liquid is delivered to a dispensing apparatus by the second pressure prevailing in the chamber.

4. The process according to claim 1, characterized in that the first and second pressures are constant.

5. The process according to claim 1 characterized in that the pressure differential between the first pressure and the second pressure is sufficient to cause the gas bubbles to burst upon entry of the liquid into the chamber.

6. A device for removing gas bubbles from a viscous liquid comprising a degassing vessel in which a sealed chamber is situated, an inlet for feeding the liquid under a first pressure into the chamber, an outlet for expelling the liquid from the chamber, and a means for maintaining a constant pressure in the chamber which pressure, in operation of the device, is lower than the first pressure.

7. The device according to claim 6, characterized by sensors for monitoring the level of liquid in the chamber.

8. The device of claim 6 wherein the means for maintaining the pressure in the chamber at a constant pressure comprises a compressed air source and a precision pressure regulator.

9. The device of claim 6 characterized in that there is arranged in the chamber a dispensing cone having an axis, tapering downwards along the axis and at a distance from the bottom of the chamber, which bears hollow needles which are aligned upwards and slightly outwards and to which the liquid is fed with the constant first pressure through ducts inside the dispensing cone, each needle having a tip which is flattened to form a broad, slot-shaped aperture, the longer dimension of the slot aperture pointing in a tangential direction relative to the axis of the dispensing cone.

10. The device according to claim 6, further characterized by a dosing valve for dispensing the liquid, which valve is connected to the outlet of the chamber by a connecting line.

11. The device according to claim 10, characterized in that the second pressure is sufficient to promote the flow of liquid through the connecting line and the dosing valve.

12. The device of claim 10 characterized in that the dosing valve includes (i) a housing having a cylindrical bore through its middle section and a conically tapered bore defining a valve seat continuing from an end of the cylindrical bore and ending in a dispensing aperture at an end of the housing and (ii) a needle valve, an end portion of which has a conical taper similar to the taper of the conically tapered bore in the housing, ending in a needle valve tip such that the tapered portion of the needle valve rests against the valve seat and the tip of the needle valve is flush with the housing at the dispensing aperture when the valve is in a closed or off state.

13. The device of claim 6 characterized in that the device includes a plurality of hollow needles for feeding liquid into the chamber through the inlet.

14. The device of claim 13 wherein the ends of the needles are markedly flattened such that a slot-shaped aperture results at the end of the needles for the emergence of the liquid.

15. The device of claim 6 further including a feed valve which is capable of interrupting the flow of liquid to the chamber.

16. The device of claim 15 further including sensors for monitoring the level of liquid and signaling the feed valve.

17. The device of claim 6 further including an apparatus for supplying liquid under a first pressure to the degassing vessel.

18. The device according to claim 17 characterized in that the apparatus for supplying the liquid with the constant first pressure has a pressure tank for a liquid stock and a compressed-air source for introducing compressed air into the pressure tank which compressed air acts upon the liquid stock to produce the constant first pressure in the pressure tank.

19. The device of claim 18 characterized in that there is arranged in the chamber a dispensing cone having an axis, tapering downwards along the axis and at a distance from the bottom of the chamber, which bears hollow needles which are aligned upwards and slightly outwards and to which the liquid is fed with the constant first pressure through ducts inside the dispensing cone, each needle having a tip which is flattened to form a broad, slot-shaped aperture, the longer dimension of the slot aperture pointing in a tangential direction relative to the axis of the dispensing cone.

* * * * *